US007895289B2

(12) United States Patent
Reinefeld et al.

(10) Patent No.: US 7,895,289 B2
(45) Date of Patent: Feb. 22, 2011

(54) DEVICE AND METHOD FOR STORING / RETRIEVING OBJECTS WITH MULTIDIMENSIONALLY ADDRESSED ELECTRONIC DATA

(75) Inventors: Alexander Reinefeld, Berlin (DE); Florian Schintke, Berlin (DE); Thorsten Schutt, Berlin (DE)

(73) Assignees: Konrad-Zuse-Zentrum fuer Informationstechnik Berlin, Berlin (DE); Humboldt-Universitaet zu Berlin, Berlin (DE)

( * ) Notice: Subject to any disclaimer, the term of this patent is extended or adjusted under 35 U.S.C. 154(b) by 580 days.

(21) Appl. No.: 11/761,208

(22) Filed: Jun. 11, 2007

(65) Prior Publication Data

US 2008/0256125 A1    Oct. 16, 2008

(30) Foreign Application Priority Data

Jun. 12, 2006    (EP) ................................ 06 012 030

(51) Int. Cl.
G06F 17/30    (2006.01)
(52) U.S. Cl. ............ 709/217; 707/103 Y; 707/E17.055
(58) Field of Classification Search ................. 709/217; 707/103
See application file for complete search history.

(56) References Cited

U.S. PATENT DOCUMENTS

| 6,772,141 | B1 | 8/2004 | Pratt et al. |
| 7,203,871 | B2 | 4/2007 | Turner et al. |
| 2003/0004938 | A1* | 1/2003 | Lawder ......................... 707/3 |
| 2004/0054807 | A1 | 3/2004 | Harvey et al. |
| 2004/0064556 | A1 | 4/2004 | Zhang et al. |
| 2005/0068946 | A1* | 3/2005 | Beshai ....................... 370/368 |
| 2007/0165619 | A1* | 7/2007 | Reinefeld et al. ............ 370/368 |
| 2009/0259713 | A1* | 10/2009 | Blumrich et al. ............ 709/201 |

FOREIGN PATENT DOCUMENTS

| WO | 2004027581 A2 | 4/2004 |
| WO | 2005057427 A1 | 6/2005 |

OTHER PUBLICATIONS

Stoica et al., Chord: A Scalable Peer-to-peer Lookup Service for Internet Application, Applications, Technologies, Architectures, and Protocols for Computer Communication archive Proceedings of the 2001 conference on Applications, technologies, architectures, and protocols for computer communications table of contents San Diego, California, US.*

(Continued)

Primary Examiner—Wing F Chan
Assistant Examiner—Kostas Katsikis
(74) Attorney, Agent, or Firm—Sutherland, Asbill & Brennan, LLC

(57) ABSTRACT

The invention provides for devices and methods for storing/retrieving objects comprising multidimensionally addressed electronic data in a system of several data processing units, in particular as regards the economy of time, even if individual units of the data processing units are unreliable.

11 Claims, 7 Drawing Sheets

OTHER PUBLICATIONS

Figure 1:
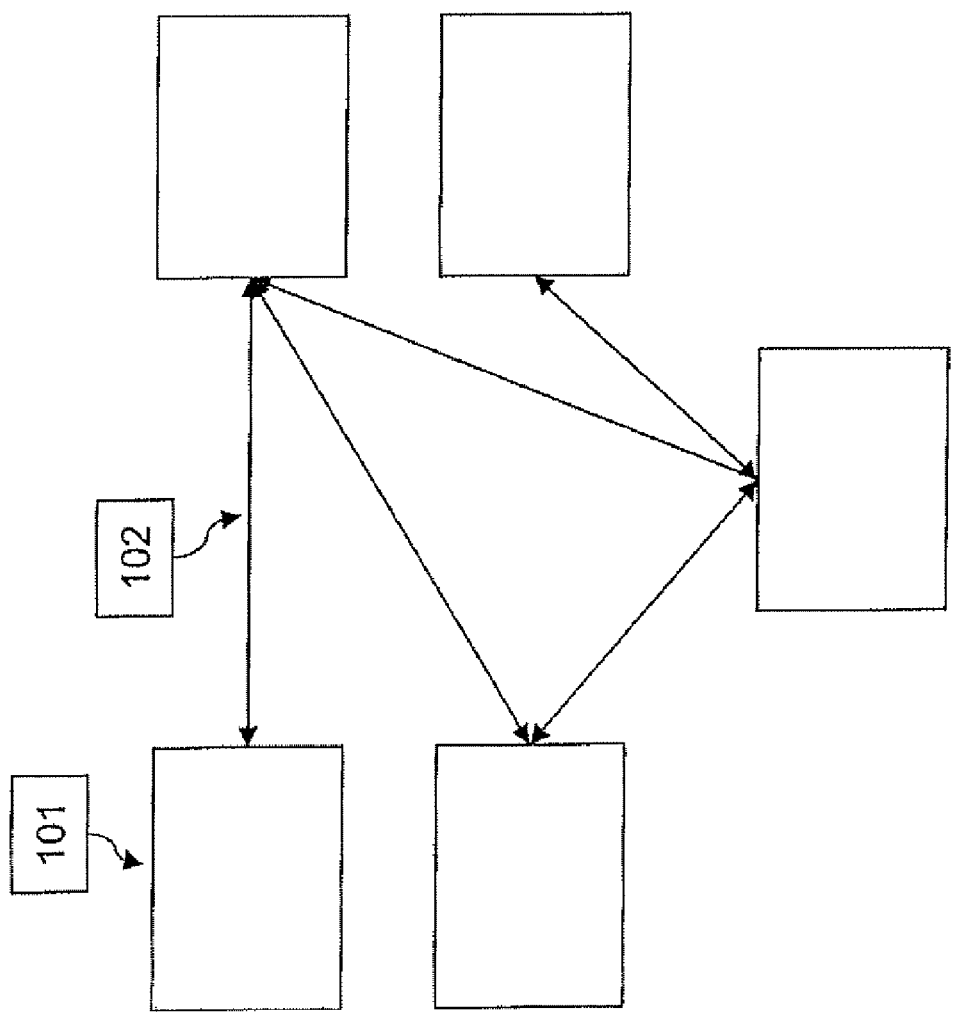

Schutt et al., Structured Overlay without Consistent Hashing: Empirical results, Cluster Computing and the Grid, 2006, CCGRID 06, May 16-19, 2006.*

Prasanna Ganesan et al, One Torus to Rule them All: Multi-Dimensional Queries in P2P Systems, Seventh International Workshop on the Web and Databases, Web DB 2004, Jun. 17-18, 2004, Paris, France.

Chawathe et al, A Case Study in Building Layered DHT Applications, SIGCOMM 2005, Paper 318, pp. 1-14.

Yangfeng Shu et al, Supporting Mulit-Dimensional Range Queries in Peer-to-Peer Systems, P2P 2005, Sep. 2005.

Thorsten Schutt et al, Structured Overlay without Consistent Hashing: Empirical Results, International Symposium on Cluster Computing and the Grid Workshops, May 2006.

Ion Stoica et al, Chord: A Scalable Peer-to-peer Lookup Protocol for Internet Applications, IEEE/ACM Transactions on Networking, Feb. 2003, vol. 11, pp. 17-32.

Ashwin R. Bharambe, et al, Mercury: Supporting Scalable Multi-Attribute Range Queries, SIGCOMM 2004, Aug. 30-Sep. 3, 2004, Portland, OR, pp. 1-14.

Han Balakrishnan et al, Looking Up Data in P2P Systems, Communications of the ACM, Feb. 2003, vol. 46, No. 2, pp. 43-48.

Disclosure Under 37 C.F.R. § 1.56 filed on Dec. 3, 2009.

Risson, John et al.; Survey of research towards robust peer-to-peer networks: Search methods; School of Electrical Engineering and Telecommunications, University of New South Wales; Jul. 7, 2005.

Daskos, Antonios et al.; PePeR: A Distributed Range Addressing Space for Peer-to-Peer Systems; Department of Computer Science, University of Southern California; 2004.

Office Action mailed Mar. 14, 2008 for European Patent Application No. 06 012 030.0.

Search Report mailed Jan. 29, 2007 for European Patent Application No. 06 012 030.0.

English Translation Summary of Office Action mailed Mar. 14, 2008 and Search Report mailed Jan. 29, 2007 for European Patent Application No. 06 012 030.0.

* cited by examiner

DEVICE AND METHOD FOR STORING / RETRIEVING OBJECTS WITH MULTIDIMENSIONALLY ADDRESSED ELECTRONIC DATA

CROSS-REFERENCE TO RELATED APPLICATION

Applicants hereby claim priority under 35 U.S.C. 119(a) to European Patent Application No. EP 06012030.0, filed Jun. 12, 2006 the disclosure of which is expressly incorporated herein by reference in its entirety.

The invention relates to a device and a method for storing/retrieving objects comprising multidimensionally addressed electronic data in a system of several data processing units that each implement a functionality of a memory apparatus.

BACKGROUND OF THE INVENTION

Techniques and methods from the area of peer-to-peer computing (P2P) have become increasingly accepted in applications with distributed systems (distributed computing). They are used more and more in their classic area of use, distributed information systems, as well as in the area of self-managing complex systems (autonomic computing).

P2P systems are distinguished over traditional systems by their scalability. The latter is achieved by the relative independence of the nodes (computers) from each other and by their interchangeability. Each node communicates only with a small number of other nodes known to it. If there is no direct contact between two nodes, information is interchanged via representatives. As a consequence, the nodes only have to supply a firmly definable number of resources in order to participate in the system, even in very large distributed systems. Operations in which more than one node participates can be efficiently realized by a suitable construction of the communication connections even in large systems.

In order to maintain the ability to function in traditional distributed systems a large part of the resources present must be expended for the monitoring, maintaining and repair of the system. The resources required for this can comprise software, hardware or personnel. P2P systems require less resources for maintaining their operation since their distributed self-healing methods (self-management algorithms) operate within a limited horizon and therefore never take the entire system into account. The methods are designed in such a manner that the composition of the local self-healing methods always preserve the entire system in a correct operable state. In particular, no knowledge of the global state of the distributed system is necessary for the correct self-healing process; the self-healing takes place based on local knowledge only.

A known weak point of information systems based on P2P systems is the defective support of complex query languages. Electronic objects can be stored and sought in P2P systems that can be unambiguously identified by a name or designator. In simple systems (Chord, CAN, Kademlia, . . . ) only objects can be found whose name is unambiguously and completely known before the beginning of the search. The concept "name" is used in the following as a synonym for "designator". The search in such systems is reduced to the question of whether the sought object exists in the system. Advanced systems allow the indication of a name range, upon which the system supplies all known objects whose names are located in this name range. Such queries are also named range queries.

A more complex name class is that of multidimensional names. Names can be represented here as a d-tuple (n0, . . . , nd) in a d-dimensional name space. Such names occur, e.g., in geoinformation systems where the individual components of the name designate properties, e.g., spatial (height, length, width, . . . ) properties, temporal (time, time interval, . . . ) properties or physical (air pressure, visibility, cloud formation, . . . ) properties.

Two classes are distinguished in range queries for multidimensional names, rectangular and non-rectangular range queries. Rectangular range queries are range queries in which a particular one-dimensional range of permitted values is indicated independently for each dimension. The totality of all maximally large one-dimensional ranges sets the entire name space. Non-rectangular range queries are defined by a function that assigns a truth value to any desired tuples of the name space. A search query supplies all names for which the function supplies "true".

Since the definition for nonrectangular range queries is too general, only such cases will be treated in the following in which the function sets a part of the name space that can be described in a simple manner. For a three-dimensional space this can be, e.g., one or more spheres, sphere segments, shells or shell segments with a defined thickness.

Several solution attempts are known. Known systems (Ganesan et al., One Torus to Rule Them All: Multidimensional Queries in P2P Systems, WebDB 2004; Chawathe et al., A Case Study in building Layered DHT Applications, SIGCOMM'05, August 2005; Shu et al., Supporting Multidimensional Range Queries in Peer-to-Peer Systems, P2P'05, September 2005) that support multidimensional range queries form the multidimensional name space on a one-dimensional name space. Space-filling functions (space filling curves) such as, e.g., z-functions or Hilbert functions are used for this. The one-dimensional names converted in this manner are stored in a traditional manner in a P2P system that supports range queries (see, e.g., Schütt et al., Structured Overlay without Consistent Hashing: Empirical Results, GP2PC '06, May 2006). Multidimensional range queries are formed on several separate one-dimensional range queries.

These systems have serious disadvantages. They only support rectangular range queries and even these must be broken down in the case of multidimensional queries into several individual one-dimensional queries. The number of parts into which the query must be broken down rises with the number of dimensions.

Ganesan et al. (see One Torus to Rule Them All: Multidimensional Queries in P2P Systems, WebDB 2004) describe another system that supports even non-rectangular range queries. The construction of their system is based on a probabilistic approach and therefore does not allow any precise statements about the search performance to be expected. The performance can only be indicated with a certain probability; it can be worse in individual concrete instances of application, as a consequence of which in particular no quality of service guarantees can be defined and maintained.

SUMMARY OF THE INVENTION

The invention has the task of making available a device and a method for storing/retrieving objects comprising multidimensionally addressed electronic data in a system of several data processing units, in particular as regards the economy of time, even if individual units of the data processing units are unreliable.

The invention is solved by a device in accordance with independent claim 1 as well as by a method in accordance with independent claim 4.

According to an aspect of the invention there is created a device with a system of several data processing units that each include a memory apparatus for receiving/supplying objects comprising multidimensionally addressed electronic data with processor means and memory means and physical data interchange connections between the several data processing units, wherein a virtual network is formed in the system in which the several data processing units are represented as a torus arrangement of several memories (S1, ..., Sn; n>1) with d dimensions (d>1) and in which an associated routing table with d subtables is formed in each of the several memories (S1, ..., Sn), which subtables include entries comprising reference information and concerning communication connections of a memory to other memories of the several memories (S1, ..., Sn), one or several name ranges of a name space for names of the objects are associated with each of the several memories (S1, ..., Sn), a total order being defined via the ranges of values of the name space that are used in d dimensions, the names of the objects can be represented as tuples (n0, ..., ng) (g<d), and the entries $E_{Sx,a}[j, i]$ ($1 \leq j < b$; $1 < b$; $1 \leq a \leq d$; $0 < i \leq n$) containing electronic reference information are formed as follows for each of the several memories (Sx; x=1, 2, ...; $1 \leq x \leq n$) of the several memories (S1, ..., Sn) in the virtual network using a base b for the a-th dimension of the torus arrangement in the associated routing table:

Entry $E_{Sx,a}[1, 1]$=Reference to the communication connection to a memory adjacent in the a-th dimension of the torus arrangement.

. . .

Entry $E_{Sx,a}[j, 1]$=Entry $E_{Sv,a}[k, 1]$ in another memory (Sv) to which an entry $E_{Sx,a}[m, 1]$ in the memory (Sx) refers, with $2 \leq j < b$, $0 < k$, m and in which k, m selectively correspond to a valid whole number occupancy of the equation k+m=j;

Entry $E_{Sx,a}[1, i]$=Entry $E_{Sv,a}[k, i-1]$ in another memory (Sv) to which an entry $E_{Sx,a}[m, i-1]$ in the memory (Sx) refers, with $1 < i$, $0 < k$, m and in which k, m selectively correspond to a valid whole number occupancy of the equation k+m=b;

. . .

Entry $E_{Sx,a}[j, i]$=Entry $E_{Sv,a}[k, i]$ in another memory (Sv) to which an entry $E_{Sx,a}[m, i]$ in the memory (Sx) refers, with $2 \leq j < b$, $1 < i$, $0 < k$, m and in which k, m selectively correspond to a valid whole number occupancy of the equation k+m=j;

According to another aspect of the invention a method is created for searching a data processing unit upon a search query in order to store an object comprising multidimensionally addressed electronic data in the data processing unit/retrieve this object from the data processing unit in a system of several data processing units each comprising a memory apparatus for receiving/supplying the object with processor means and memory means and physical data interchange connections between the several data processing units, wherein a virtual network is formed in the system in which the several data processing units are represented as a torus arrangement of several memories (S1, ..., Sn; n>1) with d dimensions (d>1) and in which an associated routing table with d subtables is formed in each of the several memories (S1, ..., Sn), which subtables include entries comprising reference information and concerning communication connections of a memory to other memories of the several memories (S1, ..., Sn), one or several name ranges of a name space for names of the objects are associated with each of the several memories (S1, ..., Sn), a total order being defined via the ranges of values of the name space that are used in the individual dimensions, and the names of the objects are represented as tuples (n0, ..., ng) (g<d), wherein in the method the search query for the object is detected in the system and the data processing unit is determined initiated by the detected search query using the electronic reference information in the associated routing table, and wherein the entries $E_{Sx,a}[j, i]$ ($1 \leq j < b$; $1 < b$; $1 \leq a \leq d$; $0 < i \leq n$) containing electronic reference information are formed as follows for each of the several memories (Sx; x=1, 2, ...; $1 \leq x \leq n$) of the several memories (S1, ..., Sn) in the virtual network using a base b for the a-th dimension of the torus arrangement in the associating routing table;

Entry $E_{Sx,a}[1, 1]$=Reference to the communication connection adjacent in the a-th dimension of the torus arrangement;

. . .

Entry $E_{Sx,a}[j, 1]$=Entry $E_{Sv,a}[k, 1]$ in another memory (Sv) to which an entry $E_{Sx,a}[m, 1]$ in the memory (Sx) refers, with $2 \leq j < b$, $0 < k$, m and in which k, m selectively correspond to a valid whole number occupancy of the equation k+m=j;

Entry $E_{Sx,a}[1, i]$=Entry $E_{Sv,a}[k, i-1]$ in another memory (Sv) to which an entry $E_{Sx,a}[m, i-1]$ in the memory (Sx) refers, with $1 < i$, $0 < k$, m and in which k, m selectively correspond to a valid whole number occupancy of the equation k+m=b;

. . .

Entry $E_{Sx,a}[j, i]$=Entry $E_{Sv,a}[k, i]$ in another memory (Sv) to which an entry $E_{Sx,a}[m, i]$ in the memory (Sx) refers, with $2 \leq j < b$, $1 < i$, $0 < k$, m and in which k, m selectively correspond to a valid whole number occupancy of the equation k+m=j;

The self-managing nature of existing P2P systems is preserved with the invention and at the same time more powerful query possibilities are created that exceed the performance features of traditional systems. In contrast to systems based on space-filling functions even non-rectangular range queries are supported by the invention. In contrast to the work of Ganesan et al. this invention is characterized by a more efficient search, better scalability in higher-dimensional name spaces and performance that can be guaranteed.

The association of the several memories to the ranges of the name space is not static but rather can be changed at any time. Changes can be necessary if, e.g., the number of memories in the system changes or if the number, distribution or the distribution of the query frequency of the names of the stored electronic objects change.

The several memories can enter into the system and leave it again at any time. The leaving can also take place by a failure and does not have to be announced in advance. The memory requirement for the reference information and the expense for maintaining the system is so low that even systems with millions of memories can be efficiently used. The memory of the several memories can be used for the most part for storing the electronic objects so that information systems with billions of objects can be designed.

A preferred further development of the invention provides that the associated routing table comprises a number of (b−1) *$\lceil \log_b n \rceil$ entries.

A purposeful embodiment of the invention can provide that at least part of the several data processing units are provided with a number of free, unoccupied dimensions.

Furthermore, the following embodiments of the method in accordance with the invention can be provided.

An advantageous embodiment of the invention provides that the number of d dimensions of the torus arrangement is changed in that one of the d subtables is removed from the associated routing table or another subtable is added to the associated routing table.

An advantageous embodiment of the invention can provide that a designator query is detected as a search query and a designator search is performed.

A further development of the invention can provide that the designator search uses of one of the d subtables in a routing step whose communication connection to a memory closest to the target is designed in such a manner that the communication connection runs to one of the following memories from the group of several memories that can be reached in a routing step:

a memory that is on the whole the closest to the target, a memory with the largest name range, a memory with the most neighbors, a randomly selected memory, a memory with the least delay time, a memory with the largest routing table, a memory with the largest subtables regarding a dimension not yet routed or routed the least within a current routing path, a memory whose routing table has the largest current status:

a memory whose subtables have the greatest current status regarding the dimension not yet routed or routed the least within the current routing path, and a memory chosen by a criterion indicated during routing in the form of a function, which criterion selects one or more memories from the memories.

A preferred further development of the invention provides that a range query is detected as search query and a range search is performed.

A purposeful embodiment of the invention can provide that the range query is detected as a non-rectangular range query and that during the execution of the range search a limiting criterion is used as function that associates a truth value to each name of the objects.

An advantageous embodiment of the invention provides that a number of line entries in one of the d subtables of the associated routing tables is reduced or increased when one of the following conditions is determined:

a number of memories contained in a dimension belonging to the d dimensions changes, a frequency of search queries in memories in the dimension belonging to the d dimensions rises above or falls below a set value, a set time interval has elapsed, and a criterion that is given as function when a memory is added and that is checked in time intervals supplies a value of "reduce" or "increase".

A further development of the invention advantageously provides that base b is selected in accordance with one of the following conditions:

base b is differently selected in different d dimensions, base b is differently selected in different memories, or base b is dynamically changed by removing or adding columns in one or more of the d subtables of the associated routing tables.

DESCRIPTION OF PREFERRED EXEMPLARY EMBODIMENTS OF THE INVENTION

The invention is explained in detail in the following using exemplary embodiments and referring to figures of the drawings.

Figure 2:
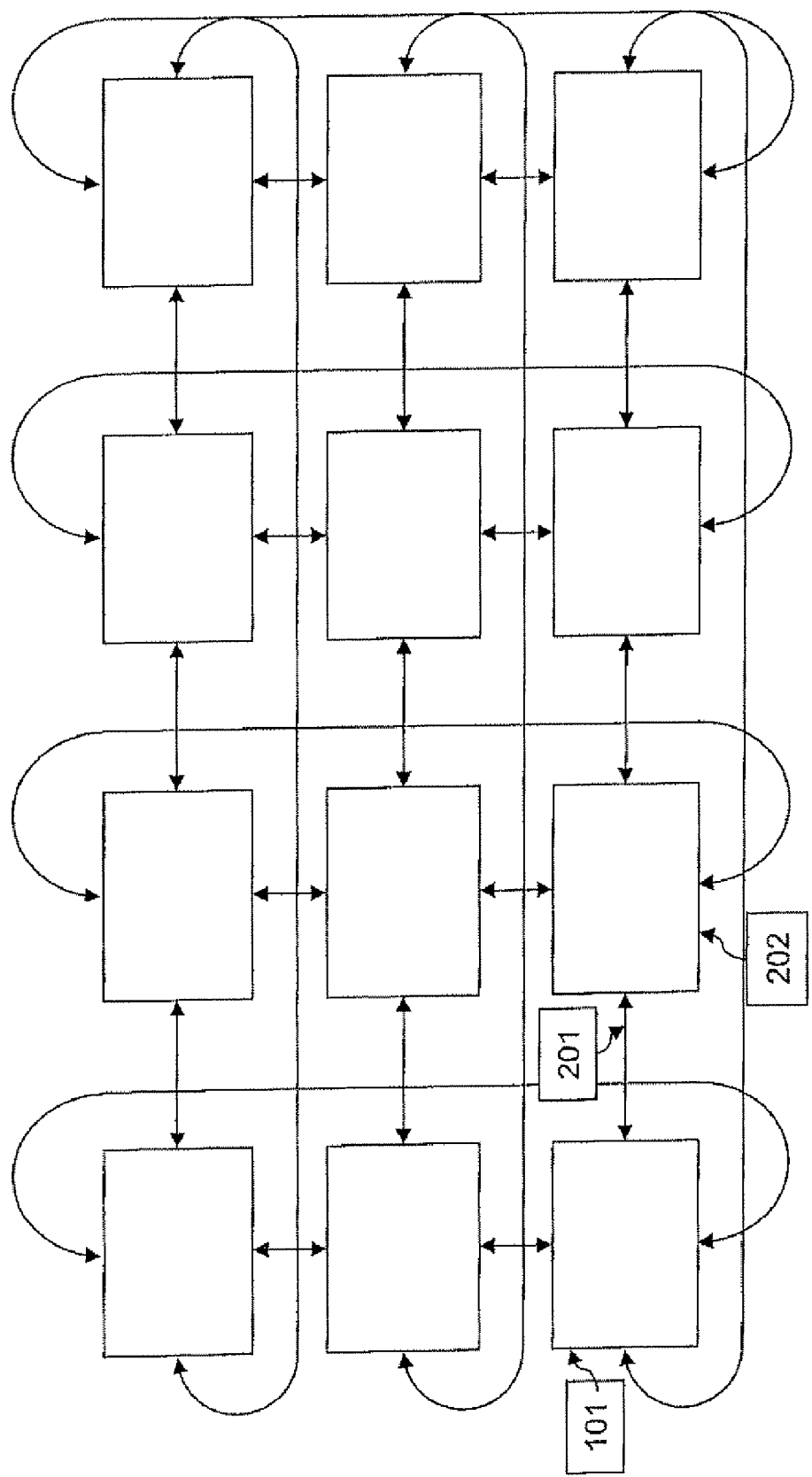
Figure 3:
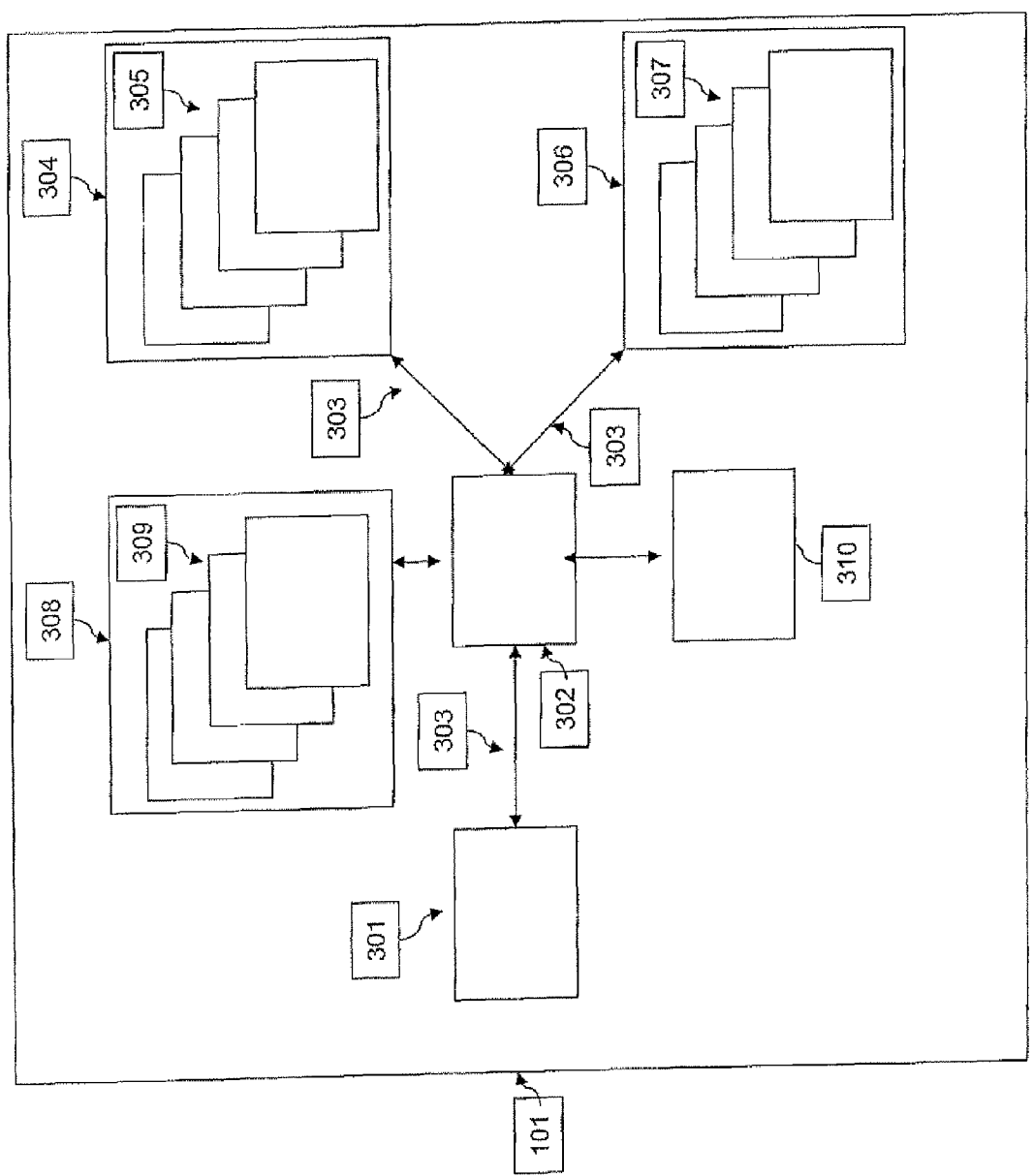
Figure 4:
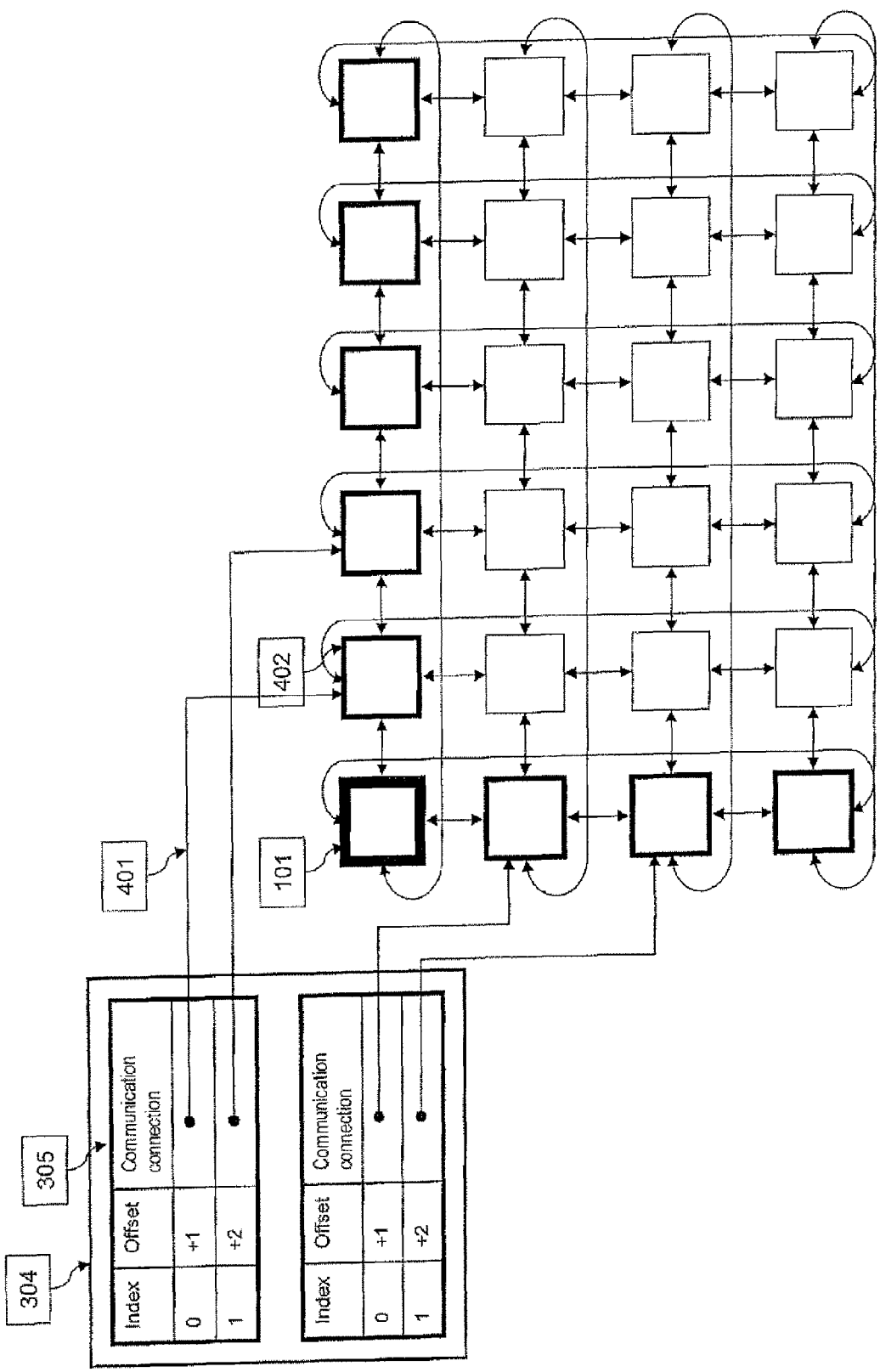
Figure 5:
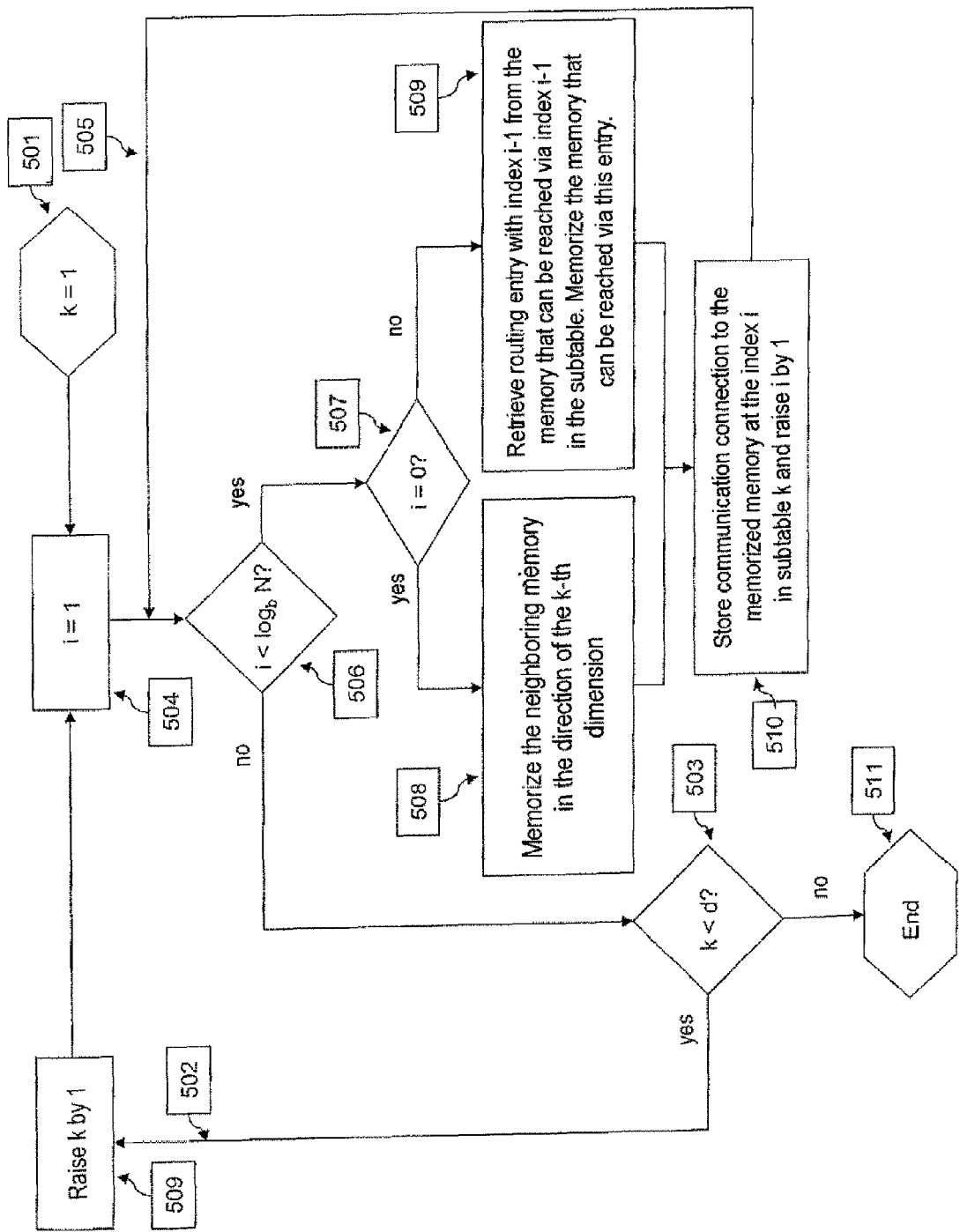
Figure 6:
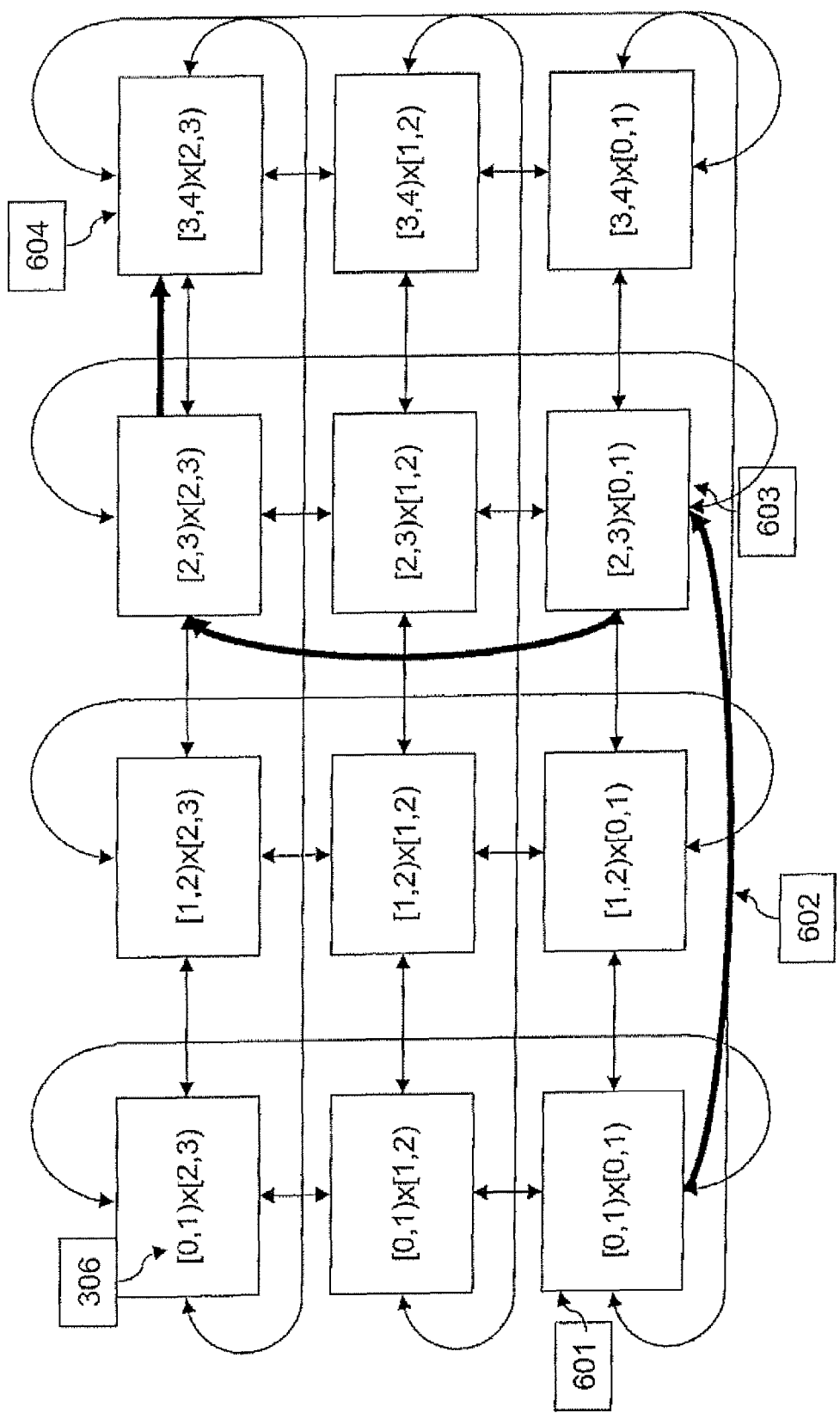
Figure 7:
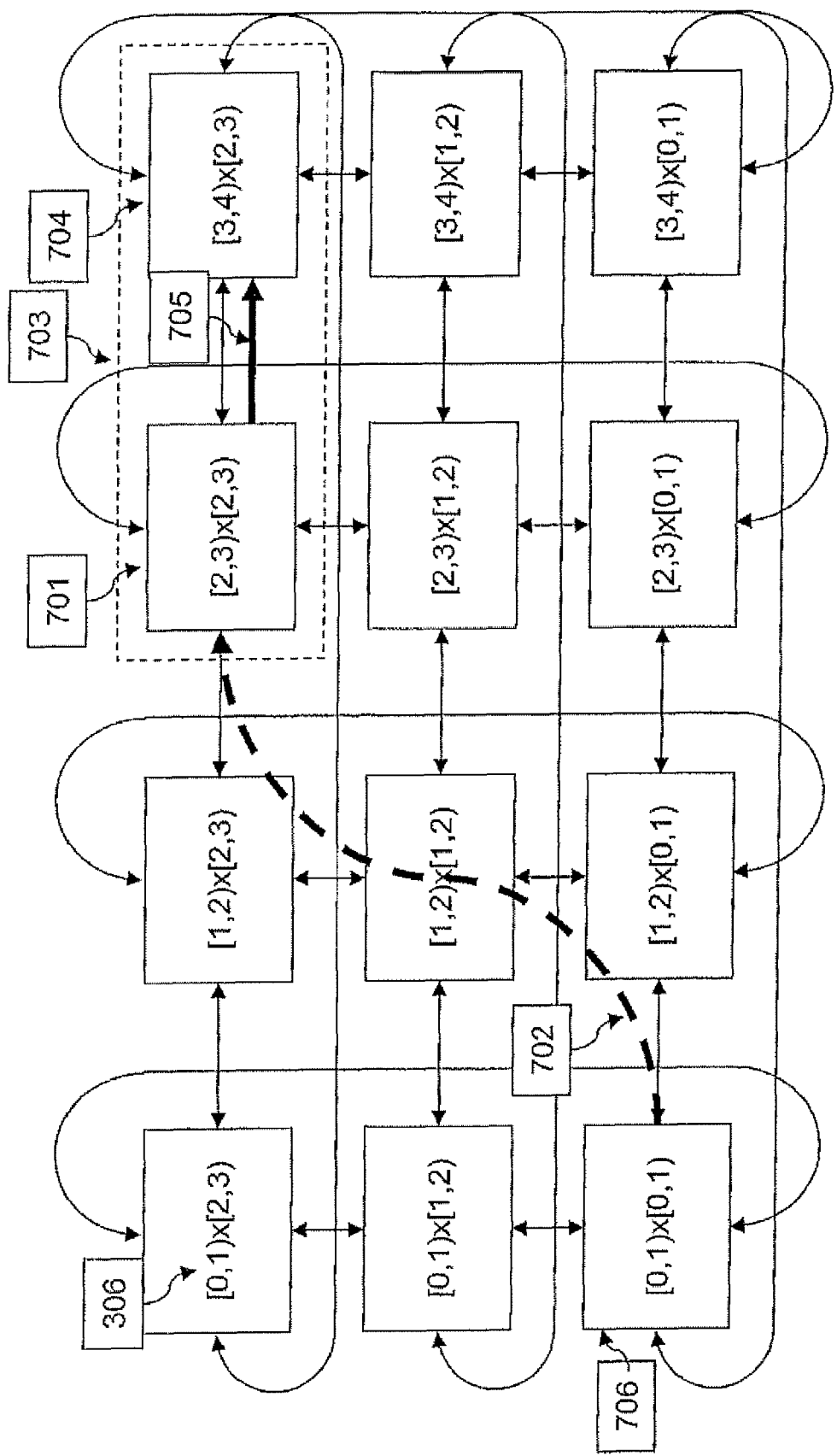

FIG. 1 shows a schematic representation of a system with several independent memories connected via communication connections, FIG. 2 is shows a schematic representation, in which the several memories of the system in FIG. 1 are arranged on a two-dimensional virtual torus and are connected via communication connections, FIG. 3 shows a schematic representation of the components of one of the several memories in FIG. 1 in detail, FIG. 4 shows a schematic representation explaining the function of subtables of a routing table of one of the several memories in FIG. 1, FIG. 5 shows a schematic representation explaining an operational sequence when filling the routing table of one of the several memories, FIG. 6 shows a schematic representation explaining a search query in the system with several memories in FIG. 1, and FIG. 7 shows a schematic representation explaining a search query with range data in the system with several memories in FIG. 1.

A method and a device for storing/retrieving electronic objects whose names can be represented as d-tuples (n1, ..., nd) via simple or via range predicates are explained in the following in a system with several independent data processing units that implement in particular the functionality of a read-write memory. n (n>1) is the total number of independent data processing units in the system here. d is the number of dimensions of a name space (corresponds, e.g., to the number of attributes). b (b≧2) designates the base for a routing (the larger b is, the fewer retransmissions of the search query).

FIG. 1 shows a schematic representation of a system that is, e.g., a computer network with several independent memories 101 designed as read-write memories or read-only memories (ROM) and with communication connections 102 between the several memories 101. Electronic data can be interchanged between memories 101 via communication connections 102. The totality of communication connections 102 between memories 101 is designated as a virtual network (overlay network) since communication connections 102 do not have to coincide with the (physical) communication connections in the network of data processing units located under them. Data can be written into the several memories 101 in the system and found again later for reading by a search. Since the several memories 101 are designed as read-write memories and electronic data can be interchanged between them, the data processing capacity necessary for this must also be made available in the system, e.g., with the aid of suitable processors.

FIG. 2 shows a schematic representation of a logical network topology between the several memories 101. The same reference numerals as in FIG. 1 are used for the same features in FIG. 2.

The several memories 101 form a d-dimensional torus arrangement, with FIG. 2 showing the special case of a two-dimensional (d=2) torus arrangement, and maintain communication connections 201 to their direct neighbors 202 on the torus arrangement. The several memories 101 completely cover the torus arrangement in the normal case; gaps can arise by dynamic influences, e.g., a failure of memories, in that individual or several memories are jumped over. All that is necessary for the system to function is that all memories must be able to be reached.

The number of neighbors depends on the distribution of the several memories 101. In the normal case it is O(d) and in very rare exceptional cases it can be up to O(n), which does not, however negatively influence the qualities of the system.

FIG. 3 shows a schematic representation of components of one of the several memories 101 from FIG. 1 in detail. The same reference numerals as in FIG. 2 are used for the same features in FIG. 3.

A communication processor 301, a processor 302, internal communication connections 303, a routing table 304, a memory for electronic information via a name range 306 associated with the memory, and memory cells 310 are provided. Processor 302 switches between communication processor 301 and memory cells 310 with the aid of routing table 304, a table from neighbor 308 and of name range 306 associated with the memory.

Communication processor 301 is responsible via communication connections 102 for the communication between memories 101 with other memories for which reference information is stored in routing table 304.

Routing table 304 consists of the subtables 305 responsible for one of the d routing dimensions and FIG. 3 shows the special case of a four-dimensional (d=4) routing table. Analogously, the name range of memory 306 is divided into the four name range subtables 307 with one name range for each of the four dimensions. Name range 306 is necessary for persistently storing the responsibilities of the several memories 101. The neighboring table 308 stores the communication connections to the neighbors in the four dimensions in four subtables 309.

Routing table 304 serves to rapidly find one or several memories of the several memories 101 that is/are responsible for a search query.

FIG. 4 shows a schematic representation of the routing table 304 and its subtables 305 of a memory 101. The same reference numerals as in FIG. 3 are used for the same features in FIG. 4.

Each of the several subtables 305 consists of several lines and columns. Each entry in each of the several subtables stores a communication connection 401 to one of the several memories 402. The entries are calculated as described further below. The special case d=2 and b=2 was used in this figure without limiting the universality. Each of the several subtables 305 is associated with one of the several dimensions. A first subtable uses the first neighbor along an x direction as the first entry and is therefore associated with the x dimension. A second subtable correspondingly uses the first neighbor along a y direction and is therefore associated with the y dimension.

FIG. 5 shows a schematic representation for explaining an operational sequence when preparing a routing table 304 and associated subtables 305 by processor 302 (see FIG. 3) for the case b=2. The same reference numerals as in FIG. 4 are used for the same features in FIG. 5.

The operational sequence begins with an initializing of a counter 501. The counter 501 monitors how often a loop 502 is passed through. Each loop passage ends with the checking for the abortion of an outer loop of 503. The outer loop 503 iterates via all subtables 305 of the routing table 304. An inner loop 505 begins with the initializing of a counter 504. The counter 504 monitors how often inner loop 505 is passed through. Each loop passage begins with the checking for abortion 506 of an inner loop 505 (it is assumed here, e.g., that the number of the several memories 101 is known, other aborting criteria are described below) and subsequently a checking 507 takes place whether a first loop passage is concerned. If the first loop passage is concerned, the following step consists of the memorization 508 of the communication connection to the neighboring memory, in the other case the step consists of the memorization 509 of the communication connection to the memory with the double distance. The termination is formed by the storing 510 of the memorized communication connection in the routing table. When the method arrives at end 511 the execution is broken off.

The preparation of a routing table for base b=2 is explained in detail in the following.

At first only one neighboring memory in the clockwise direction (the method also functions analogously counter-clockwise) is known for the particular dimension. The method with b=2 is to be explained at first here. The k entries in the subtable are consecutively numbered beginning at index 1. The first table entry is always the mentioned direct neighbor in the direction of the associated dimension. The following entries are calculated with the aid of the previous entries. In order to calculate an entry with the index m in the subtable of a routing table of a memory Sx the memory before it, that is, with the index m−1 in the same subtable of the routing table of memory Sx is used. A memory Sy is asked via the associated communication connection entered in the subtable of the routing table, which memory is reached via the communication connection entered in its associated subtable of the same dimension of the routing table with the index m−1. Let this be a memory Sz. A communication connection to precisely this memory Sz is then entered at a position m of the original memory Sx, which can be summarized as follows:

Entry $E_{Sx,a}[1, 1]$=reference to the communication connection to the memory adjacent in the a-th dimension.

...

Entry $E_{Sx,a}[1, m]$=entry $E_{Sv,a}[1, m-1]$ in another memory (Sv) to which an entry $E_{Sx,a}[1, m-1]$ in the memory (Sx) refers, in which $1<m\leq k$.

In this manner the electronic information distributed in the subtables of the routing tables of the several memories is used. A memory in the vicinity of the query target in which the name of the objects sought was filed has more precise information about the distribution of the memories in its immediate surroundings then the searching memory.

The preparation of a routing table for the base b>2 is explained in detail in the following.

Larger values can be selected for base b in order to reduce the number of the required steps for a search for $\lceil \log_b n \rceil$. The entries $E_{Sx,a}[j, i]$ ($1\leq j<b$, $2<b$, $1\leq a\leq d$; $0<i\leq n$) in the associated routing tables are then formed as follows:

Entry $E_{Sx,a}[1, 1]$=Reference to the communication connection to a memory adjacent in the a-th dimension of the torus arrangement;

...

Entry $E_{Sx,a}[j, 1]$=Entry $E_{Sv,a}[k, 1]$ in another memory (Sv) to which an entry $E_{Sx,a}[m, 1]$ in the memory (Sx) refers, with $2\leq j<b$, $0<k$, m and in which k, m selectively correspond to a valid whole number occupancy of the equation $k+m=j$;

Entry $E_{Sx,a}[1, i]$=Entry $E_{Sv,a}[k, i-1]$ in another memory (Sv) to which an entry $E_{Sx,a}[m, i-1]$ in the memory (Sx) refers, with $1<i$, $0<k$, m and in which k, m selectively correspond to a valid whole number occupancy of the equation $k+m=b$;

...

Entry $E_{Sx,a}[j, i]$=Entry $E_{Sv,a}[k, i]$ in another memory (Sv) to which an entry $E_{Sx,a}[m, i]$ in the memory (Sx) refers, with $2 \leq j < b$, $1 < i$, $0 < k$, m and in which k, m selectively correspond to a valid whole number occupancy of the equation $k+m=j$;

If the base is $b>2$ there are several alternatives for calculating the entries of the subtables that are defined by a different selection of parameters for solving the equation $k+m=j$ or correspondingly $k+m=b$. As b increases the number of alternative calculation possibilities rises, which improves the error tolerance (e.g., in the case of a failed, removed memory) as well as the quality of the entries. In order to improve the quality, e.g., all available solutions could be considered and a suitable result selected.

In this manner, the described method makes it possible to eliminate the hash function used in CAN, Chord and other P2P systems without losing its positive qualities such as scalability, error tolerance or the like but making range queries possible at the same time.

Routing table 304 of a memory 101 of the several memories 101 consists of one or several subtables 305. The size of routing table 304 can be freely selected within certain boundaries since its existence is not necessary for the correct function. It serves in particular to accelerate the search for entries. Routing table 304 maximally contains $d*(b-1)\lceil \log_b n \rceil$ entries to communication connections 401 with d indicating the number of dimensions, n the total number of the several memories 101 participating in the system and b the base. This most unfavorable ease occurs very seldom; in the average case routing table 304 has $(b-1)*\lceil \log_b n \rceil$ entries to communication connections 401. Additional entries do not improve the search speed.

Each subtable 305 thus manages a maximum of $\lceil \log_b n \rceil$ lines with $b-1$ entries with communication connections 401. The sum of the entries of all subtables 305 of a routing table 304 is on the average $(b-1)\lceil \log_b n \rceil$. Even the sizes of the subtables are checked in the regular checking of the entries in the routing tables.

In order to build up again or update the entries of subtable 305 of routing table 304 of one of the several memories 101 all entries of subtable 305 are recalculated in accordance with the above comments for preparing a routing table, beginning with the first entry that contains the direct successor. Since a P2P system is concerned, memory 101 does not know how many members are necessary in order to form a ring along the dimension concerned. Let the exact value be R in the following. The optimal number of entries in the corresponding subtable 305 would then be $(b-1)\lceil \log_b R \rceil$.

A possible method for identifying superfluous entries results from the knowledge that each entry in subtable 305 must point to a memory that must be located between the memory designated by the preceding entry in the same subtable and between the current memory itself, in which case the first entry of the subtable is always the direct successor and the word "between" refers to the order in the particular dimension. If this condition is not fulfilled the entry is redundant and can be deleted.

Dimensions can be added to or removed from the runtime. Each dimension corresponds to a name range or to an attribute with a freely definable value range. In order to add a new attribute and therewith a new dimension to the data contained in the system of several memories 101, another subtable is added to subtables 305 of routing table 304 (see FIG. 3) and the name range of memory 306 is correspondingly expanded.

The introduction of a new dimension can be realized in different manners, e.g., as follows:

- All of the several memories 101 are informed upon the introduction of the new dimension and change their data structures in a corresponding manner.
- All of the several memories 101 have from the start a freely selectable, rather large number of dimensions from which a few "unused" ones have not yet been partitioned.
- All of the several memories 101 participate implicitly in all possible dimensions of the torus arrangement regardless of whether data about this dimension is or was actually addressed in the system. No subtable is required for this and therefore no storage space is occupied. A subtable is not created for this until at the first partitioning of the dimension in this memory.

FIG. 6 shows a schematic representation of the operational sequence of the search for a designator.

If the search is initiated from a component that is not one of the several memories 101 it must charge one of the several memories 101 with the search that the latter executes substitutionally. The search begins at a start memory 601 of the several memories 101. The latter searches subtables 305 of its routing table 304 for communication connections 602 that refer to one of the several memories 603 that is closer to the target 604 than memory 601 itself The search query is passed on to it and the method is correspondingly repeated there. The passing on of the search query is repeated until memory 604 has been found, that is responsible for the searched data. The termination of this process is guaranteed since the distance to the target memory is reduced with each step.

In order to find the memory and the communication connection for which the distance to the target is minimal, a measure for the distance must be defined. Since a part of the name space is associated with each memory, the distance of a selected point of this partial space to the point of the searched-for name could serve as measure of distance. The selected point could be, e.g., a certain corner, the focal point or the average value. Since the subtables of the several routing tables have a preferred direction for each of the several dimensions and store more information in it, the measure of distance must take this circumstance into account, for which reason a directed measure of distance is used. Another measure of distance could, e.g., take into consideration the size of the space managed by the memory since memories that occupy a large part of the namespace have more neighbors and can therefore fall back on more information in the next step in order to shorten the distance to the target more effectively than would be possible for memories with a smaller part of the name space.

FIG. 7 shows a schematic representation of the operational sequence of a range query.

Range queries take place in a manner similar to exact search queries; however, a multistage process is used that makes more flexibility possible. At first, a memory 701 is searched for analogously to the exact search query via a routing path 702 responsible for at least one part of the searched-for range 703. When this memory has been found the search query is forwarded from there recursively to neighbors 704 via retransmissions 705 until the entire searched-for range 703 has been covered. The search result follows from the combining of all partial results. In special cases retransmission 705 can also take place via communication connections 401 entered in routing tables 304. The participating memories 701 and 704 send their partial results independently and selectively via different communication connections to the searching memory 706. In contrast to comparable, conjunctively linked "select-where" queries of relational databanks, no superfluous partial amounts are transmitted and filtered out again at the target location, which saves bandwidth as well as computing capacity.

Searching at first for the focal point or central point of the range to be searched presents itself, since as a result thereof the search query has to be forwarded from there approximately equally far in all directions. However, even several placing points can also be selected, e.g., the corners of the searched-for range, and subsequently the search query is forwarded from there inside the searched-for range. The runtime can be reduced by increasing the parallelism.

Non-rectangular range queries take place analogously to rectangular range queries since memories whose associated name ranges are adjacent are also adjacent in the network and thus cohesive areas of the name space are stored in directly adjacent memories. As a result, rectangular as well as non-rectangular range queries can be carried out via a placing point with subsequent local search. In contrast thereto, traditional methods based on space-filling curves do not always store the name space of cohesive areas in adjacent memories, which has the consequence of an increased search expenditure since several independent searches must be started via the network.

If a memory is to be added to the system of several memories 101, at first a communication connection 102 to any one of the memories 101 already present in the system must be built up. Then, one of the memories 101 present on the system is selected that will share its previous part of the name space with the newly arrived memory. This memory can be selected randomly or based on load information or other criteria. The memory that is already part of the system divides its part of the name space into two parts. This memory itself will be responsible in the future for one of the two parts and the newly arrived memory will be responsible in the future for the other part of the two parts. The sole limitation in the selection of the division is that the cut must be parallel to one of the several dimensions. The resulting parts must neither contain equally large names nor equally many stored names. As a result thereof the allocated part of the name space can be adapted individually to the performance capacity of the several memories or to the expected query load.

When the two memories have agreed on a division the necessary stored information is transferred to the new memory and the latter can fill its internal data structures and communicate its presence to its neighbors. The neighbors can then appropriately renew their adjacent tables 308. Alternatively, the adjacent tables can be checked at regular time intervals and be updated if necessary.

Often memories can not announce leaving the system in advance. Errors can result in states in which this is no longer possible. Therefore, all memories must observe the system continuously or in intervals and react appropriately to events.

If a memory stored in a routing table can no longer be reached, this entry is ignored and updated at the proper time. Individual references to non-reachable memories in the routing table do not endanger the stability of the total system. More critical are references to non-reachable memories in the adjacent tables. If these entries are not renewed in a timely manner irreparable damage can be caused by a possible partitioning and the associated inability to reach active memories in the virtual network.

The features of the invention disclosed in the previous description, the claims and the drawings can be significant individually as well as in any combination for the realization of the invention in its embodiments.

The invention claimed is:

1. A system of several data processing units that each includes a memory apparatus for receiving and supplying objects, comprising multidimensionally addressed electronic data, wherein each of the several data processing units comprises a processor and physical data interchange connections between the several data processing units, wherein:

a virtual network is formed in the system in which the several data processing units are represented as a torus arrangement of several memories $(S_1, \ldots, S_n; n>1)$ with dimensions $(d>1)$ and in which an associated routing table with d sub tables is formed in each of the several memories $(S_1, \ldots, S_n)$, which sub tables include entries $E_{Sx,a}[j,i]$ ($1 \leq j < b$; $1 < b$; $1 \leq a \leq d$; $0 < i \leq n$) comprising electronic reference information and concerning communication connections of a particular memory of the several memories $(S_1, \ldots, S_n)$ to other memories of the several memories $(S_1, \ldots, S_n)$;

one or several name ranges of a name space for names of the objects are associated with each of the several memories $(S_1, \ldots, S_n)$, a total order being defined via the ranges of values of the name space that are used in d dimensions;

the names of the objects can be represented as tuples $(n_0, \ldots, n_g)$ $(g<d)$; and the entries $E_{Sx,a}[j,i]$ ($1 \leq j < b$; $1 < b$; $1 \leq a \leq d$; $0 < i \leq n$) comprising electronic reference information are formed as follows for each of the several memories $(S_x; x=1, 2, \ldots; 1 \leq x \leq n)$ of the several memories $(S_1, \ldots, S_n)$ in the virtual network using a base b for the a-th dimension of the torus arrangement in the associated routing table:

Entry $E_{Sx,a}[1,1]$=Reference to the communication connection to a memory adjacent in the a-th dimension of the torus arrangement;

Entry $E_{Sx,a}[j,l]$=Entry $E_{Sv,a}[k,l]$ in another memory $(S_v)$ to which an entry $E_{Sx,a}[m,l]$ in the memory $(S_x)$ refers, with $2 \leq j < b$, $0 < k$, m and in which k, m selectively correspond to a valid whole number occupancy of the equation k+m=j;

Entry $E_{Sx,a}[1,i]$=Entry $E_{Sv,a}[k, i-l]$ in another memory $(S_v)$ to which an entry $E_{Sx,a}[m, i-l]$ in the in the memory $(S_x)$ refers, with $1<i, 0<k$, m and in which k, m selectively correspond to a valid whole number occupancy of the equation k+m=b; and Entry $E_{Sx,a}[j,i]$=Entry $E_{Sv,a}[k,i]$ in another memory $(S_v)$ to which an entry $E_{Sx,a}[m,i]$ in the memory $(S_x)$ refers, with $2 \leq j < b$, $1 < i$, $0 < k$, m and in which k, m selectively correspond to a valid whole number occupancy of the equation k+m=j.

2. The system according to claim 1, wherein the associated routing table comprises a number of $(b-l)*[\log_b n]$ entries.

3. The system according to claim 1, wherein at least part of the several data processing units are provided with a number of free, unoccupied dimensions.

4. A method for searching a data processing unit upon a search query in order to store an object comprising multidimensionally addressed electronic data in the data processing unit and to retrieve this object from the data processing unit in a system of several data processing units that each comprises a memory apparatus for receiving and supplying the object and comprising a processor and physical data interchange connections between the several data processing units, the method comprising:

forming a virtual network in the system in which the several data processing units are represented as a torus arrangement of several memories $(S_1, \ldots, S_n; n>1)$ with dimensions $(d>1)$ and in which an associated routing table with d sub tables is formed in each of the several memories $(S_1, \ldots, S_n)$, which sub tables include entries $E_{Sx,a}[j,i]$ ($1 \leq j < b$; $1 < b$; $1 \leq a \leq d$; $0 < i \leq n$) comprising electronic reference information and concerning communication connections of a particular memos of the several memories ($S_1, \ldots, S_n$) to other memories of the several memories ($S_1, \ldots, S_n$);

associating one or several name ranges of a name space for names of the objects with each of the several memories ($S_1, \ldots, S_n$), a total order being defined via the ranges of values of the name space that are used in the individual dimensions;

representing the names of the objects as tuples ($n_0, \ldots, n_g$) ($g<d$); wherein the search query for the object is detected in the system and the data processing unit is initiated by the detected search query using the electronic reference information in the associated routing table, and in which the entries $E_{Sx,a}[j,i]$ ($1 \leq j < b$; $1 < b$; $1 \leq a \leq d$; $0 < i \leq n$) comprising electronic reference information are formed as follows for each of the several memories ($S_x$; $x=1, 2, \ldots$; $1 \leq x \leq n$) of the several memories ($S_1, \ldots, S_n$) in the virtual network using a base b for the a-th dimension of the torus arrangement in the associated routing table:

Entry $E_{Sx,a}[1,1]$=Reference to the communication connection to a memory adjacent in the a-th dimension of the torus arrangement;

Entry $Es_{x,a}[j,1]$=Entry $E_{Sv,a}[k,1]$ in another memory ($S_v$) to which an entry $E_{Sx,a}[m,1]$ in the in the memory ($S_x$) refers, with $2 \leq j < b$, $0 < k$, m and in which k, m selectively correspond to a valid whole number occupancy of the equation k+m=j;

Entry $E_{Sx,a}[1,i]$=Entry $E_{Sv,a}[k, i-1]$ in another memory ($S_v$) to which an entry $E_{Sx,a}[m, i-1]$ in the in the memory ($S_x$) refers, with $1<i$, $0<k$, m and in which k, m selectively correspond to a valid whole number occupancy of the equation k+m=b; and Entry $E_{Sx,a}[j,i]$=Entry $E_{Sv,a}[k,i]$ in another memory ($S_v$) to which an entry $E_{Sx,a}[m,i]$ in the memory ($S_x$) refers, with $2 \leq j < b$, $1 < i$, $0 < k$, m and in which k, m selectively correspond to a valid whole number occupancy of the equation k+m=j.

5. The method according to claim 4, wherein the number of d dimensions of the torus arrangement is changed in that one of the d sub tables is removed from the associated routing table or another sun table is added to the associated routing table.

6. The method according to claim 4, wherein a designator query is detected as a search query and a designator search is performed.

7. The method according to claim 6, wherein the designator search uses of one of the d sub tables in a routing step whose communication connection to a memory closest to the target is designed in such a manner that the communication connection runs to one of the following memories from the group of several memories ($S_1, \ldots, S_n$) that can be reached in a routing step:
   a memory that is on the whole the closest to the target;
   a memory with the largest name range;
   a memory with the most neighbors;
   a randomly selected memory;
   a memory with the least delay time;
   a memory with the largest routing table;
   a memory with the largest sub tables regarding a dimension not yet routed or routed the least within a current routing path;
   a memory whose routing table has the largest current status;
   a memory whose sub tables have the greatest current status regarding the dimension not yet routed or routed the least within the current routing path; or
   a memory chosen by a criterion indicated during routing in the form of a function, which criterion selects one or more memories from the memories ($S_1, \ldots, S_n$).

8. The method according to claim 4, wherein a range query is detected as a search query and a range search is performed.

9. The method according to claim 8, wherein the range query is detected as a non-rectangular range query and that during the execution of the range search a limiting criterion is used as a function that associates a truth value to each name of the objects.

10. The method according to claim 4, wherein a number of line entries in one of the d sub tables of the associated routing tables is reduced or increased when one of the following conditions is determined:
   a number of memories contained in a dimension belonging to the d dimensions changes;
   a frequency of search queries in memories in the dimension belonging to the d dimensions rises above or falls below a set value;
   a set time interval elapsed; or
   a criterion that is given as a function when a memory is added and that is checked in time intervals supplies a value of reduce or increase.

11. The method according to claim 4, wherein the base b is selected in accordance with one of the following conditions:
   base b is differently selected in different d dimensions;
   base b is differently selected in different memories ($S_1, \ldots, S_n$); or
   base b is dynamically changed by removing or adding columns in one or more of the d sub tables of the associated routing tables.

\* \* \* \* \*